United States Patent
Cuenot

(10) Patent No.: US 6,752,955 B2
(45) Date of Patent: Jun. 22, 2004

(54) METHOD OF MANUFACTURING A BOOT SEAL

(75) Inventor: Gene L. Cuenot, Novi, MI (US)

(73) Assignee: TRW Inc., Lyndhurst, OH (US)

( * ) Notice: Subject to any disclaimer, the term of this patent is extended or adjusted under 35 U.S.C. 154(b) by 390 days.

(21) Appl. No.: 09/904,754

(22) Filed: Jul. 13, 2001

(65) Prior Publication Data

US 2003/0011107 A1 Jan. 16, 2003

(51) Int. Cl.$^7$ .................... B29C 49/04; B29C 31/10
(52) U.S. Cl. .............. 264/508; 264/514; 264/563; 264/571; 264/167; 264/173.17; 425/113; 425/388; 425/396
(58) Field of Search .................. 264/508, 514, 264/563, 571, 167, 173.17, 511; 425/113, 388, 396

(56) References Cited

U.S. PATENT DOCUMENTS

| | | |
|---|---|---|
| 2,702,996 A | 8/1954 | Davis |
| 2,761,295 A | 10/1955 | Davis |
| 4,282,722 A | 8/1981 | Orain |
| 4,319,872 A | 3/1982 | Lupke et al. |
| 4,439,130 A | 3/1984 | Dickhut et al. |
| 4,456,269 A | 6/1984 | Krude et al. |
| 4,486,929 A | 12/1984 | Dickhut et al. |
| 4,718,680 A | 1/1988 | Halconruy et al. |
| 4,718,844 A | 1/1988 | Dickhut et al. |
| 4,961,480 A | 10/1990 | Weiler et al. |
| 5,035,677 A | 7/1991 | Kanamaru et al. |
| RE33,701 E | 9/1991 | Triquet |
| 5,059,109 A | 10/1991 | Dickhut et al. |
| 5,251,916 A | 10/1993 | Martin et al. |
| 5,257,924 A | 11/1993 | Dickhut et al. |
| 5,405,569 A * | 4/1995 | Lupke ................... 264/504 |
| 5,460,771 A | 10/1995 | Mitchell et al. ........... 264/508 |
| 5,472,659 A | 12/1995 | Hegler et al. ........... 425/326.1 |
| 5,489,201 A | 2/1996 | Berns et al. |
| 5,494,430 A | 2/1996 | Berns et al. |
| 5,531,583 A | 7/1996 | Berns et al. |
| 5,645,871 A | 7/1997 | Berns et al. |
| 5,695,202 A | 12/1997 | Cartwright et al. |

* cited by examiner

*Primary Examiner*—Suzanne E. McDowell
(74) *Attorney, Agent, or Firm*—Tarolli, Sundheim, Covell & Tummino L.L.P.

(57) ABSTRACT

In a process and an apparatus for making a plastic sleeve (56), plastic is fed into an extruder die (216). The plastic is extruded from the extruder die (216) as a molten plastic stream into a mold cavity (272) having an inner wall (270) with dimensions greater than the outside dimensions of the molten plastic stream. A first end (274) of the inner wall (270) includes a first projection (282) extending radially inward of the mold cavity (272) and circumferentially completely around the mold cavity (272). The molten plastic stream is vacuum expanded radially against the inner wall (270) and around the projection (282) to form a plastic sleeve (56) with a circumferential rib (74) and a aligned external first groove (92) at one end (60) of the sleeve (56).

8 Claims, 6 Drawing Sheets

METHOD OF MANUFACTURING A BOOT SEAL

FIELD OF THE INVENTION

The present invention relates to a method and apparatus for making a plastic sleeve, and particularly relates to a method of manufacturing a boot seal for sealing a movable joint in a vehicle steering or suspension system.

BACKGROUND OF THE INVENTION

A conventional rack and pinion steering gear for a vehicle has a boot seal. The boot seal protects a ball joint that connects the rack to a tie rod and a bearing that allows movement between the rack and a housing. If the boot seal is damaged during operation of the vehicle, water and other contaminants may contact the ball joint and the rack and cause the ball joint and the rack to rust and bind against movement. Damage to the boot seal can be caused by fatigue, punctures, cuts, tears, or abrasive wear.

A boot seal is typically formed by molding a thermoplastic or a thermosetting elastomer into the configuration in which the boot seal is to be installed in the rack and pinion steering gear apparatus. The molded boot seal is placed around the tie rod and the housing and secured by metal clips.

SUMMARY OF THE INVENTION

The present invention is a process for making a corrugated plastic sleeve having an internal diameter, a circumferential rib projecting inward from the internal diameter at one end of the sleeve, and an external first groove aligned with the rib. The rib is for securing the plastic sleeve to a member. The process comprises feeding a plastic into an extruder die. The plastic is extruded from the extruder die as a molten plastic stream into a mold cavity having an inner wall with dimensions greater than the outside dimensions of the molten plastic stream. The inner wall of the mold cavity includes an end portion and a corrugated portion. The end portion includes a projection extending radially inward of the mold cavity and circumferentially completely around the mold cavity. The molten plastic stream is vacuum expanded radially against the mold cavity inner wall and around the projection. Thus, a plastic sleeve with the circumferential rib and the aligned external first groove at one end of the plastic sleeve is formed.

The present invention also relates to an apparatus for making a plastic sleeve having an internal diameter, a circumferential rib projecting inwardly from the internal diameter at one end of the sleeve, and an external first groove aligned with the rib, wherein the rib is for securing the plastic sleeve to a member having a second external groove for receiving the rib. The apparatus comprises an extruder die for extruding a molten plastic stream and a mold cavity for receiving the molten plastic stream from the extruder die. The mold cavity has an inner wall with dimensions greater than the outside dimensions of the molten plastic stream. One end of the inner wall includes a projection extending radially inward of the mold cavity and circumferentially completely around the mold cavity. The apparatus further comprises a vacuum system for expanding the molten plastic stream radially against the mold cavity and around the projection. Thus, a plastic sleeve with the circumferential rib and the aligned external first groove at one end of the sleeve is formed.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF ONE SPECIFIC PREFERRED EMBODIMENT OF THE INVENTION

Figure 1:
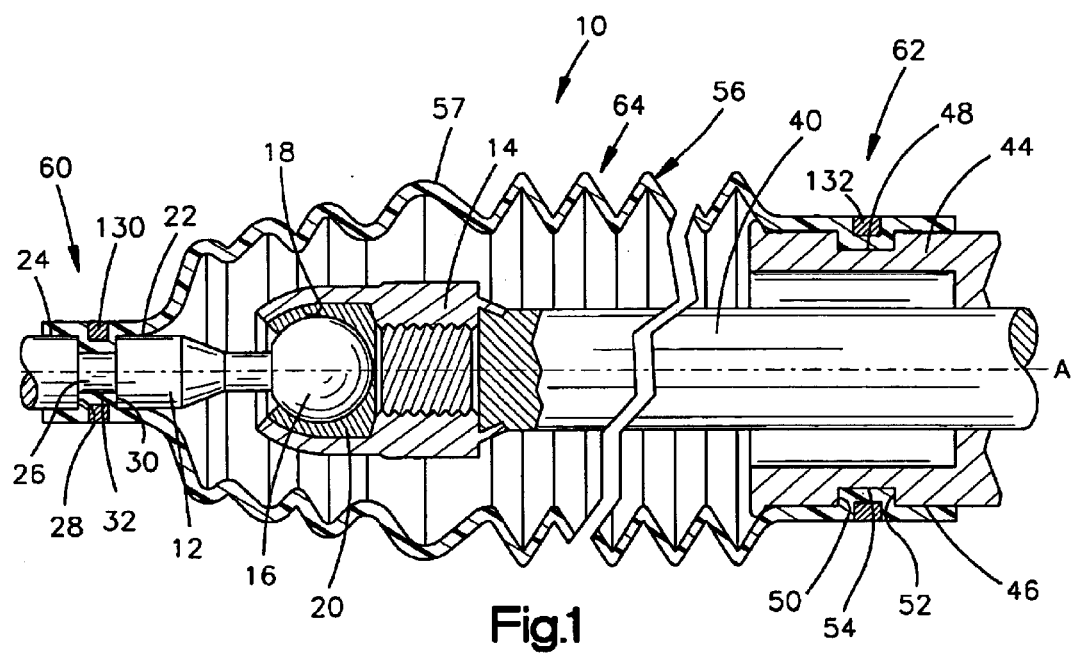
FIG. 1 is a schematic broken view of a movable joint of a vehicle steering system employing a boot seal.

A ball joint apparatus for a rack and pinion steering gear of a vehicle steering or suspension system is illustrated in FIG. 1. Referring to FIG. 1, the apparatus 10 comprises a tie rod 12 and a rack 14. The tie rod 12 has a ball end 16 located in a socket 18 of the rack 14. A bearing 20 is located in the socket 18, and supports the ball end 16 of the tie rod 12 for limited movement relative to the rack 14.

The tie rod 12 further has a rod portion 22 projecting longitudinally from the ball end 16 along axis A. The rod portion 22 is connectable with a movable part (not shown) of a vehicle steering or suspension system in a known manner.

The rod portion 22 has a generally cylindrical shape and an outer surface 24. A first annular groove 26 extends radially inward from the outer surface 24 of the rod portion 22 toward axis A. The groove 26 is defined by a first radially extending surface 28, a second radially extending surface 30, and an axially extending surface 32 that interconnects the first and second radially extending surfaces 28 and 30.

The rack 14 has a shaft 40 that extends longitudinally from the socket 18 through a rack housing 44. The shaft 40 is connectable with another movable part of the steering or suspension system in a known manner. The rack housing 44 supports the shaft 40 for axial movement of the shaft 40 relative to the rack housing 44.

The rack housing 44 is generally cylindrical in shape and has an outer cylindrical surface 46. A second annular groove 48 extends radially inward from the outer surface 46 of the rack housing 44 toward axis A. The second groove 48 is defined by a first radially extending surface 50, a second radially extending surface 52, and an axially extending surface 54 that interconnects the first and second radially extending surfaces 50 and 52.

Figure 2:
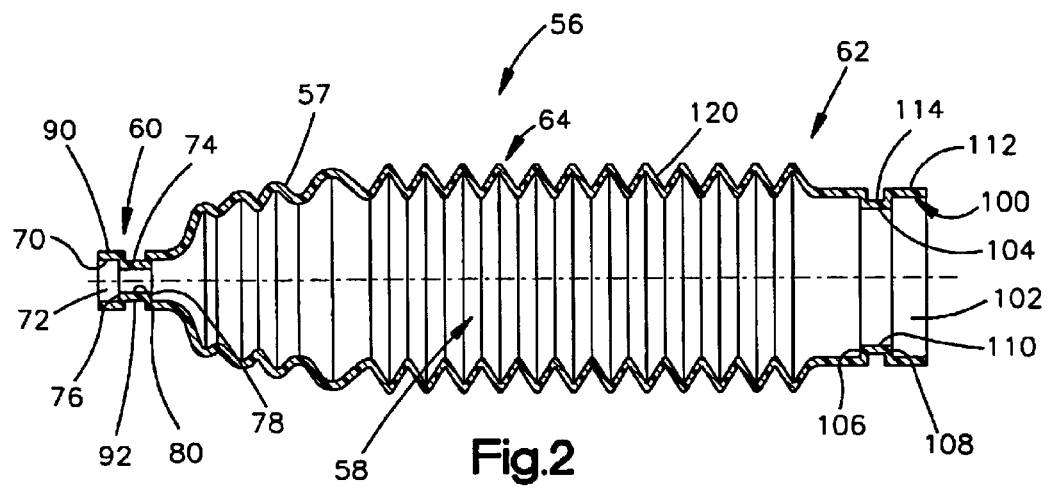
FIG. 2 is a sectional view of the boot seal of FIG. 1.

A boot seal 56 in the form of a sleeve around the apparatus 10 shields the bearing 20, the rack 14, and the ball end 16 of the tie rod 12 from dirt and other foreign substances. The boot seal 56 comprises a body 57 defining a cavity 58. As can be seen in FIGS. 1 and 2, the body 57 includes a first end portion 60, a second end portion 62, and a center portion 64. The first end portion 60, the second end portion 62, and the center portion 64 of the body 57 are integral with one another and comprise a single one piece member.

Referring to FIG. 2, the first end portion 60 has an inner surface 70 that defines a first opening 72 and a first internal diameter. The internal diameter of the first end portion 60 is substantially equal to the diameter of the outer surface 24 of the rod portion 22.

A circumferential rib 74 projects inward from the internal diameter of the inner surface 70. The circumferential rib 74 includes a first radially extending surface 76, a second radially extending surface 78, and an axially extending surface 80 that interconnects the first and second radially extending surfaces 76 and 78. The internal diameter of the axially extending surface 80 is substantially equal to the diameter of the axially extending surface of the first groove 26.

The first end portion 60 also has a cylindrical outer surface 90. The cylindrical outer surface 90 includes a first external groove 92. The first external groove 92 of the first end portion 60 is aligned with the circumferential rib 74 and extends radially inward from the external surface 90 of the first end portion 60.

The second end portion 62 of the body 57 has an inner cylindrical surface 100 that defines a second opening 102 and a second internal diameter. The second internal diameter of the second end portion 62 is substantially equal to the diameter of the outer surface 46 of the rack housing 44.

The second end portion 62 includes a second circumferential rib 104 that projects inward from the internal diameter of the inner surface 100. The second circumferential rib 104 includes a first radially extending surface 106, a second radially extending surface 108, and an axially extending surface 110 that interconnects the first and second radially extending surfaces 106 and 108. The internal diameter of the axially extending surface 110 is substantially equal to the diameter of the axially extending surface 54 of the second groove 48.

The second end portion 62 also has a cylindrical outer surface 112. The cylindrical outer surface 112 includes a second external groove 114. The second external groove 114 is aligned with the second circumferential rib 104 and extends radially inward from the cylindrical outer surface 112 of the second end portion 62.

The center portion 64 of the body 57 of the boot seal 56 interconnects the first end portion 60 with the second end portion 62. The center portion 64 comprises radially extending corrugations 120, which are known in the art. The distances between the peaks and valleys of the corrugations 120 are not critical, and are dictated by the apparatus with which the boot seal 56 is used.

When the boot seal 56 is installed in the ball joint apparatus 10 the tie rod 12 is received in the first opening into the cavity 58 of the boot seal 56. The first end portion 60 of the boot seal 56 encircles the rod portion 22 of the tie rod 12. The first circumferential rib 74 is received in the first annular groove 26 of the rod portion 22 and provides a seal between the first end portion 60 of the boot seal 56 and rod portion 22 of the tie rod 12.

At the second end portion 62 of the boot seal 56, the rack housing 44 is received in the second opening 102 into the cavity 58 of the boot seal 56. The second end portion 62 of the boot seal 56 encircles the rack housing 44. The second circumferential rib 104 is received in the second annular groove 48 of the rack housing 44 to provide a seal between the second end portion 62 of the boot seal 56 and the rack housing 44.

The seal which is provided between the first end portion 60 of the boot seal 56 and the rod portion 22 of the tie rod, as well as the seal, which is provided between the second end portion 62 of the boot seal 50 and the rack housing 44, protects the ball joint apparatus 10 from dirt, water, or other contaminants which can damage the ball joint apparatus 10.

Optionally, a first clamp 130 can be fit into the first external groove 92 of the first end portion 60 of the boot seal 56. The first clamp clamps the first end portion 60 of the boot seal 56 firmly against the rod portion 22 of the tie rod 12. Similarly, a second clamp 132 can be fit into the second external groove 114 of the second end portion 62. The second clamps the second end portion 62 of the boot seal 56 firmly against the second housing 44.

The center portion 64 of the boot seal 56 deflects between the boot seal end portions 60 and 62 upon movement of the ball stud 12 relative to the ball housing 14. The relative movement is pivotable but can also be longitudinal to a limited extent depending upon the particular design of the steering or suspension system. A lubricant (not shown) for the bearing 20, such as grease or the like, may be contained within the cavity 58 of the boot seal 56.

The boot seal 56 (FIGS. 1 and 2) is formed of a flexible thermoplastic elastomeric material. The boot seal 56 can comprise one ply of a flexible thermoplastic material, multiple plies of a flexible thermoplastic material, or multiple plies of different flexible thermoplastic materials. In a preferred embodiment of the present invention, the boot seal comprises an inner ply and an outer ply. Preferably, the inner ply is formed of a thermoplastic material selected for flexibility and softness, and the outer ply is formed of a polyester thermoplastic elastomer selected for toughness and resistance to hydrocarbon chemicals.

A preferred polyester thermoplastic elastomer for the outer ply is a copolyester resin marketed by Eastman Chemical Products, Inc. under the trademark ECDEL, which is disclosed in U.S. patent application Ser. No. 09/564,653 filed May 18, 2000 to Cuenot and which is incorporated herein by reference. ECDEL is believed to be a cycloaliphatic thermoplastic copolyester (a copolyester-ether). A preferred grade of ECDEL for the present invention is 9967. ECDEL is stretch toughenable.

A preferred thermoplastic material used to form the inner ply is a polyolefin. Polyolefins have more flexibility than polyesters. This enhances the flexibility of the boot seal 56. A preferred polyolefin for the inner ply is a polyether resin marketed by Eastman Chemical Products, Inc. under the trademark MXSTEN. This polyolefin is a polyethylene resin used primarily in the packaging field. An advantage in the use of MXSTEN is that it is stretch toughenable similar to ECDEL. Other polyolefins that are extrusion moldable, or any flexible extrudable film forming material that is soft and bondable with a polyester resin such as a polyurethane, can be used as the inner ply.

The inner ply need not be a polyolefin or similar soft extrudable material, such as a polyurethane. For instance, boot seals in accordance with the present invention can be made wherein both plies and are ECDEL polyester. However, this may require the surfaces of the plies which engage to be essentially free of surface micro-roughness.

It is also possible to use an inner ply of ECDEL wherein the ECDEL is blown or sponged. This is accomplished using conventional blowing agents and procedures. By using blown ECDEL as the inner ply, the inner ply is made softer so that it has softness properties similar to those of a polyolefin. Thus, it is usable where the surfaces of the inner and outer plies that engage have micro-roughness and imperfections. At the same time, the inner ply has strength properties of stretch-toughened ECDEL.

Similarly, the outer ply need not be a 100% polyester thermoplastic elastomer. Boot seals in accordance with the present invention have been successfully made wherein the outer ply contains a substantial weight percentage of MXSTEN as well as a polyester thermoplastic elastomer. The ECDEL present in the outer ply even in small amounts, when stretch-toughened, offers superior puncture resistance. The advantage in incorporating an amount of MXSTEN in the outer ply as well as in the inner ply is that it enhances the bonding strength of the outer ply to the inner ply.

Figure 3:
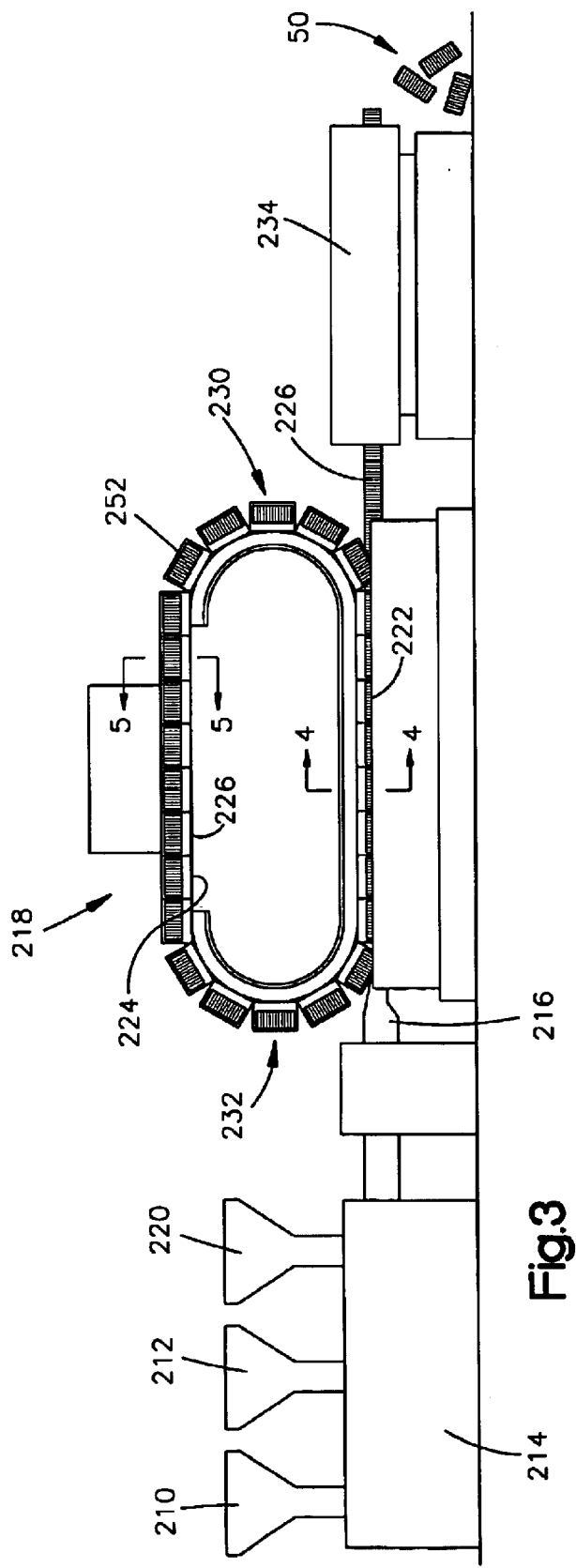
FIG. 3 is a schematic elevation view of a forming apparatus for making the boot seal of FIG. 1.

The boot seal 56 is formed in a continuous extrusion/vacuum molding process as disclosed in FIG. 3. The process of FIG. 3 will be described for the manufacture of a boot seal comprising an outer ply of ECDEL and an inner ply of MXSTEN, with the inner and outer plies bonded together by an adhesive bonding layer. Referring to FIG. 3, the ECDEL resin is fed into one hopper 210 for introduction into the process, and MXSTEN resin is fed into a second hopper 212 for introduction into the process. The resins flow to a heated extruder 214 in separate chambers (not shown in FIG. 3), and then as separate flows of molten plastic into an extruder die 216. The extruder die 216 comprises concentric separate pathways which introduce concentric layers of molten plastic into a corrugator 218.

Simultaneous with the above steps, an adhesive is fed into a third hopper 220, and from there into the heated extruder 214 for flow through the extruder die 216 as a molten stream between the concentric layers of ECDEL and MXSTEN.

The corrugator 218 is a continuous vacuum corrugator manufactured by Cullom Machine Tool & Die, Inc. of Cleveland, Tenn. The machine is disclosed in U.S. Pat. Nos. 4,439,130 and 5,257,924 which are incorporated herein by reference. Cullom Machine Tool & Die, Inc. is also the owner of U.S. Pat. Nos. 4,486,929; 4,718,844; 5,494,430; 5,645,871; 5,059,109; 5,489,201; and 5,531,583; all disclosing subject matter relating to that of the '130 and '924 patents, also incorporated herein by reference. Another United States Patent containing relevant subject matter is U.S. Pat. No. 4,319,872 incorporated herein by reference.

The corrugator 218 comprises a continuous series of mold blocks 252 which travel in a counterclockwise direction, in FIG. 3, on an inner track 224. The track 224 has a forward run 222 which extends from near the extruder 216 for essentially the full length of the lower area of the corrugator, and a return run 226 which extends for essentially the full length of the upper area of the corrugator. The corrugator 218 comprises transition areas 230 and 232 between the forward and return runs 222 and 224.

As shown in FIG. 3, molded plastic tubing 226 exits continuously from the forward run 222 and is passed to a cutter 234 which cuts the tubing into individual boot seals 50 of desired lengths.

Figure 4:
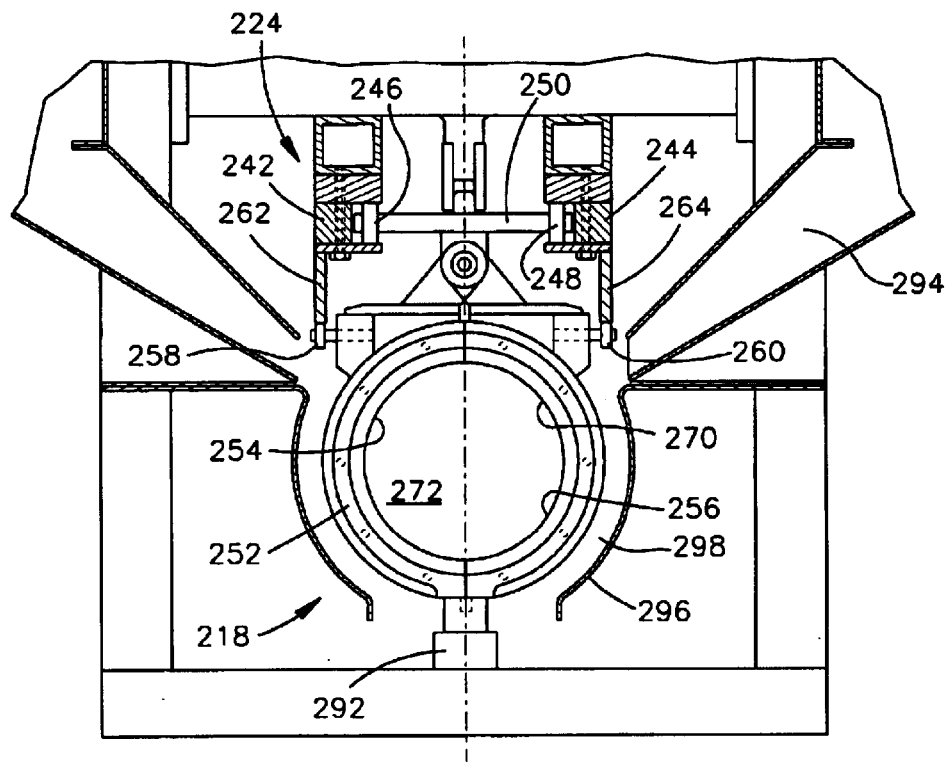
FIG. 4 is an enlarged detailed sectional view taken along line 4—4 of FIG. 3.

Referring to FIG. 4, which is an enlarged, detailed section view of the corrugator 218 in the forward run 222 (FIG. 3), the track 224 of corrugator 218 (FIG. 4) comprises a pair of internal rails 242 and 244 that extend continuously around the inside of the corrugator 218. Carriage rollers 246 and 248 are received into the rails 242 and 244. The carriage rollers 246 and 248 are mounted on the ends of a shaft 250 that in turn supports mold block 252. Multiple mold blocks 252 are connected together in a continuous series around the corrugator, as shown in FIG. 3. The mold blocks 252 are each comprised of clam-shaped mold halves 254 and 256. In FIG. 4, the mold halves 254 and 256 are in a closed position with the halves being brought together by the camming action of guide rollers 258 and 260 against cam surfaces 262 and 264.

Figure 5:
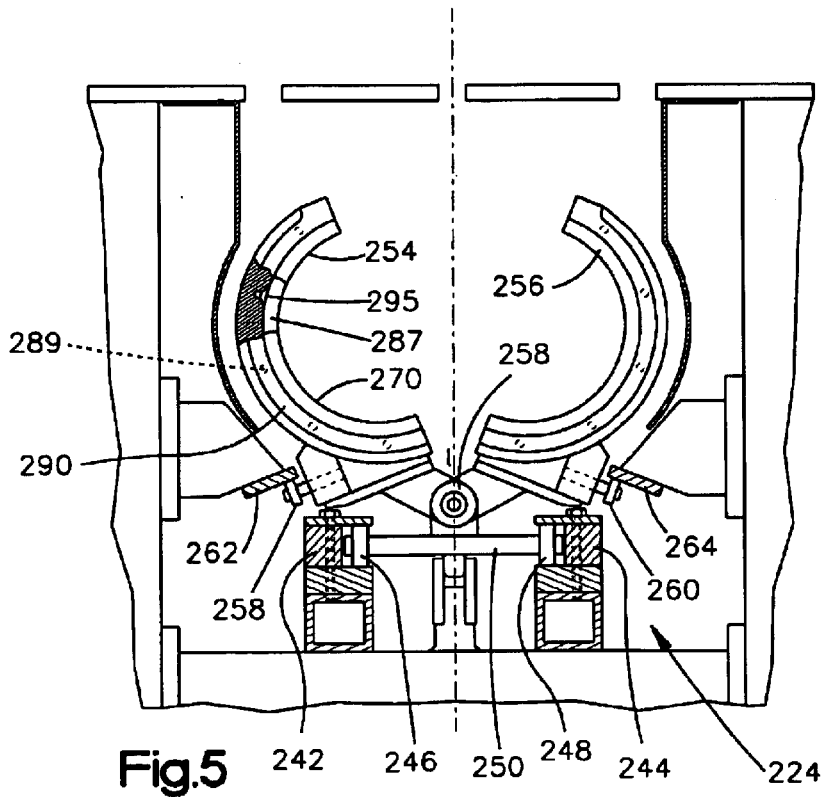
FIG. 5 is an enlarged detailed sectional view taken along line 5—5 of FIG. 4.

Referring to FIG. 5, the corrugator 218 in the return run 226 (FIG. 3), the clam-shaped mold halves 254 and 256 are pivoted apart, on pivot center 258 (FIG. 5), so that each mold block 252 is in an open position. In FIG. 5, the mold halves 254 and 256 are pivoted into the open position by cam surfaces 262 and 264 acting on guide rollers 258 and 260.

Referring to FIG. 3, the mold halves 254 and 256 are in the closed position of FIG. 4 for essentially the full extent of the forward run 222, and in the open position of FIG. 5 for essentially the full extent of the return run 226. In the transition areas 230 and 232, the mold halves pivot from the closed position of FIG. 4 to the open position of FIG. 5, and vice versa, respectively.

In the closed position of FIG. 4, the clam shaped mold halves 254 and 256 form an inner wall 270 (FIG. 6) that defines a mold cavity 272 having the shape of the outer surface of the boot seal 56.

Figure 6:
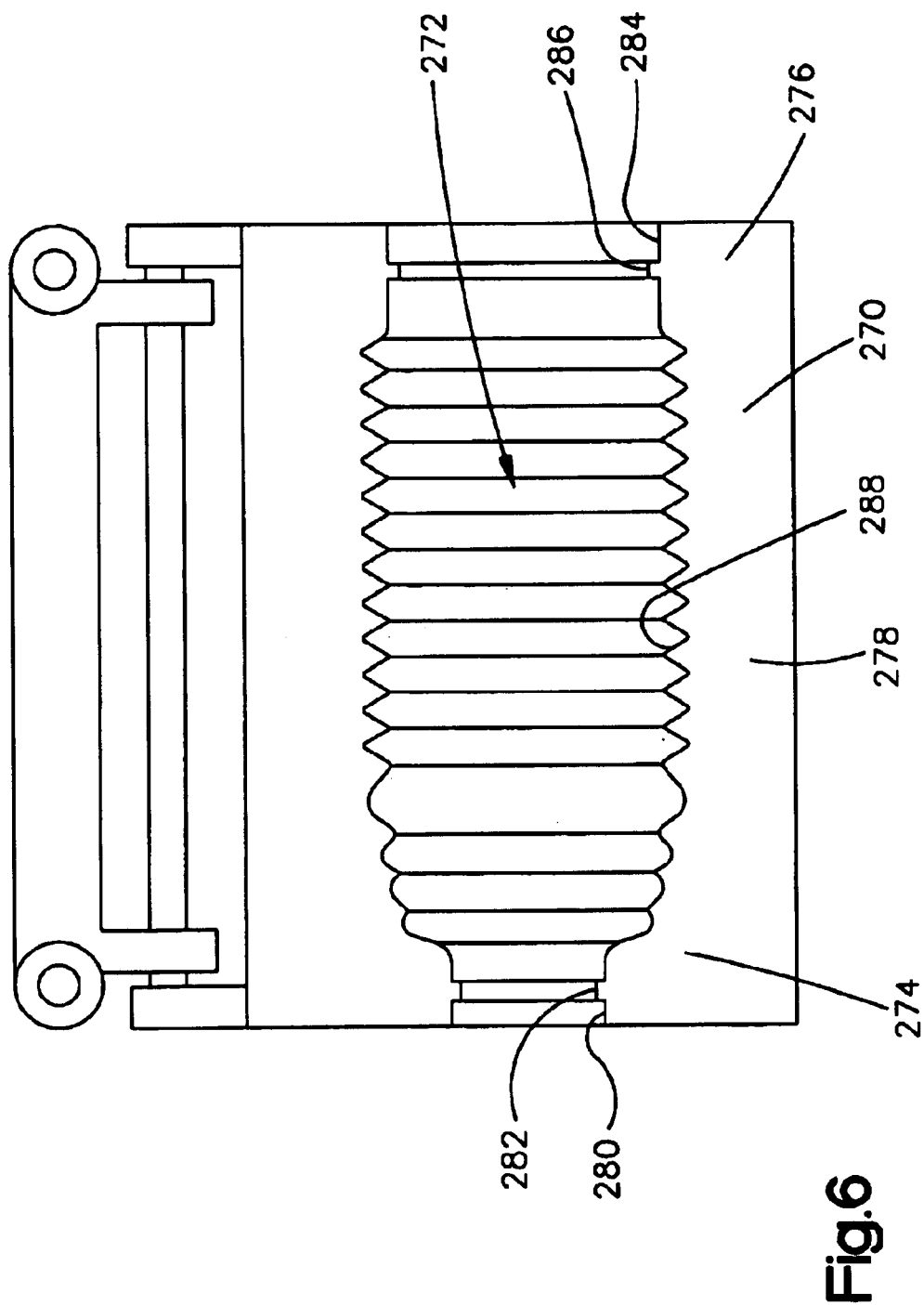
FIG. 6 is a schematic sectional view of a mold cavity in the apparatus of FIG. 3.

Referring to FIG. 6, which is a schematic sectional view of the inner wall 270 of the mold cavity 272, the inner wall 270 has an axially extending first end 274, a second end 276, and a center 278. The first end 274 has a first axially extending cylindrical surface 280 and a first projection 282 that extends radially inward from the first axially extending cylindrical surface 280. The first projection 282 extends circumferentially completely around the first axially extending cylindrical surface 280 of the inner wall 270.

The second end 276 has a second axially extending cylindrical surface 284 and a second projection 286 that extends radially inward from the second axially extending cylindrical surface 284. The second projection 286 extends circumferentially completely around the second axially extending cylindrical surface 284 of the inner wall 270.

The center portion 278 of the inner wall 270 is interposed between the first end 274 and the second end 278. The center portion 278 has an axially extending corrugated surface 288 that interconnects the first axially extending surface 280 and the second axially extending surface 284.

Figure 7:
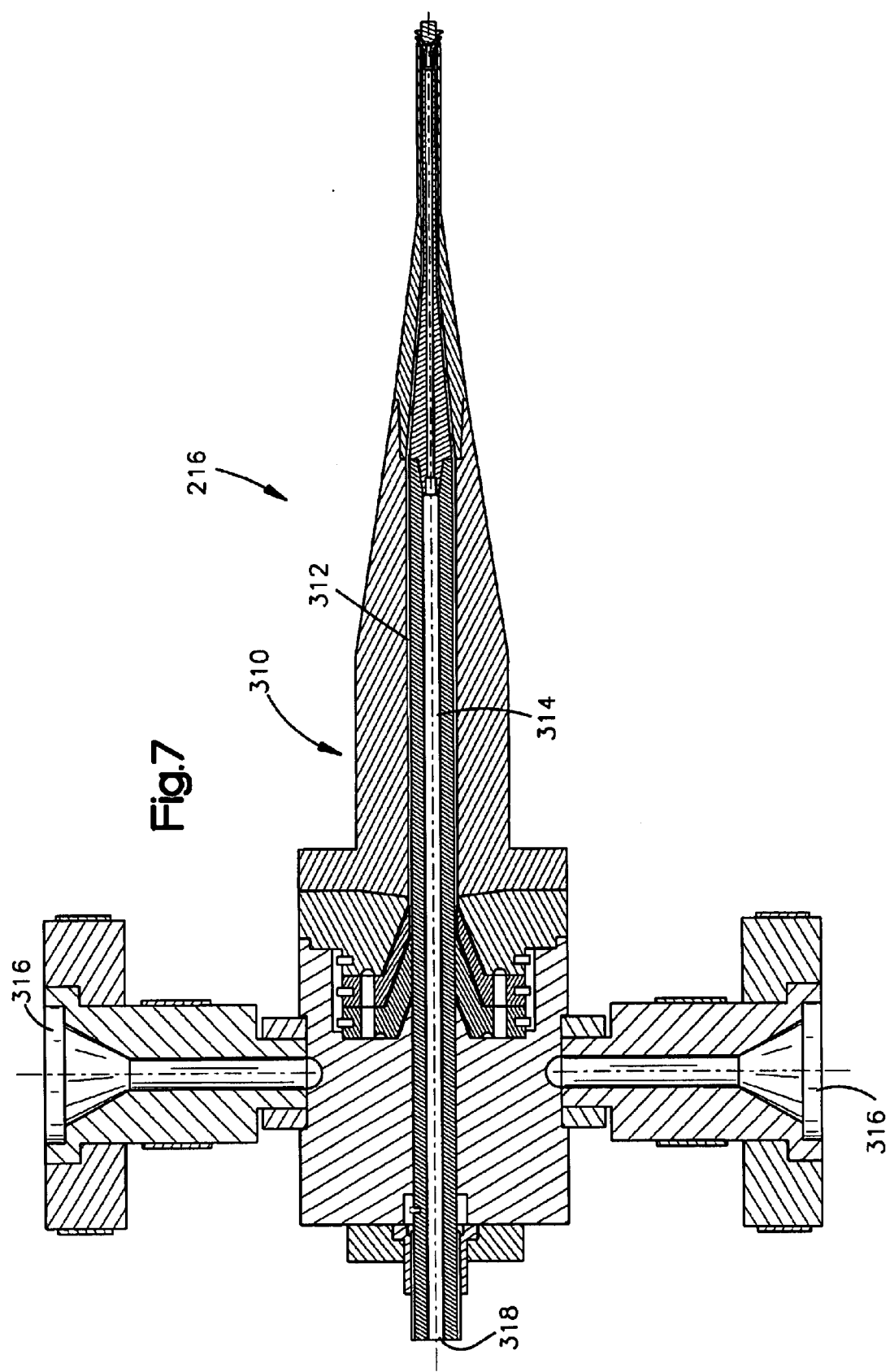
FIG. 7 is an enlarged detailed sectional view of an extruder die in accordance with an embodiment of the present invention.

Details of one embodiment of the extruder die 216 are shown in FIG. 7. The extruder die 216 in the embodiment of FIG. 7 is adapted for the co-extrusion of two layers of plastic, i.e., an inner ply and an outer ply. Instead of two layers of plastic, the extruder die 216 can be adapted for the extrusion of one layer of plastic or three layers of plastic.

Referring to FIG. 7, the extruder die 116 comprises a die block 310. The die block 310 has a first passageway 312 for the outer ply, and a second passageway 314 for the inner ply. Passageways 312 and 314 are coaxial. Molten plastic introduced into ports 316 feed the first passageway 312 and molten plastic introduced into port 318 feeds the second passageway 314.

Figure 8:
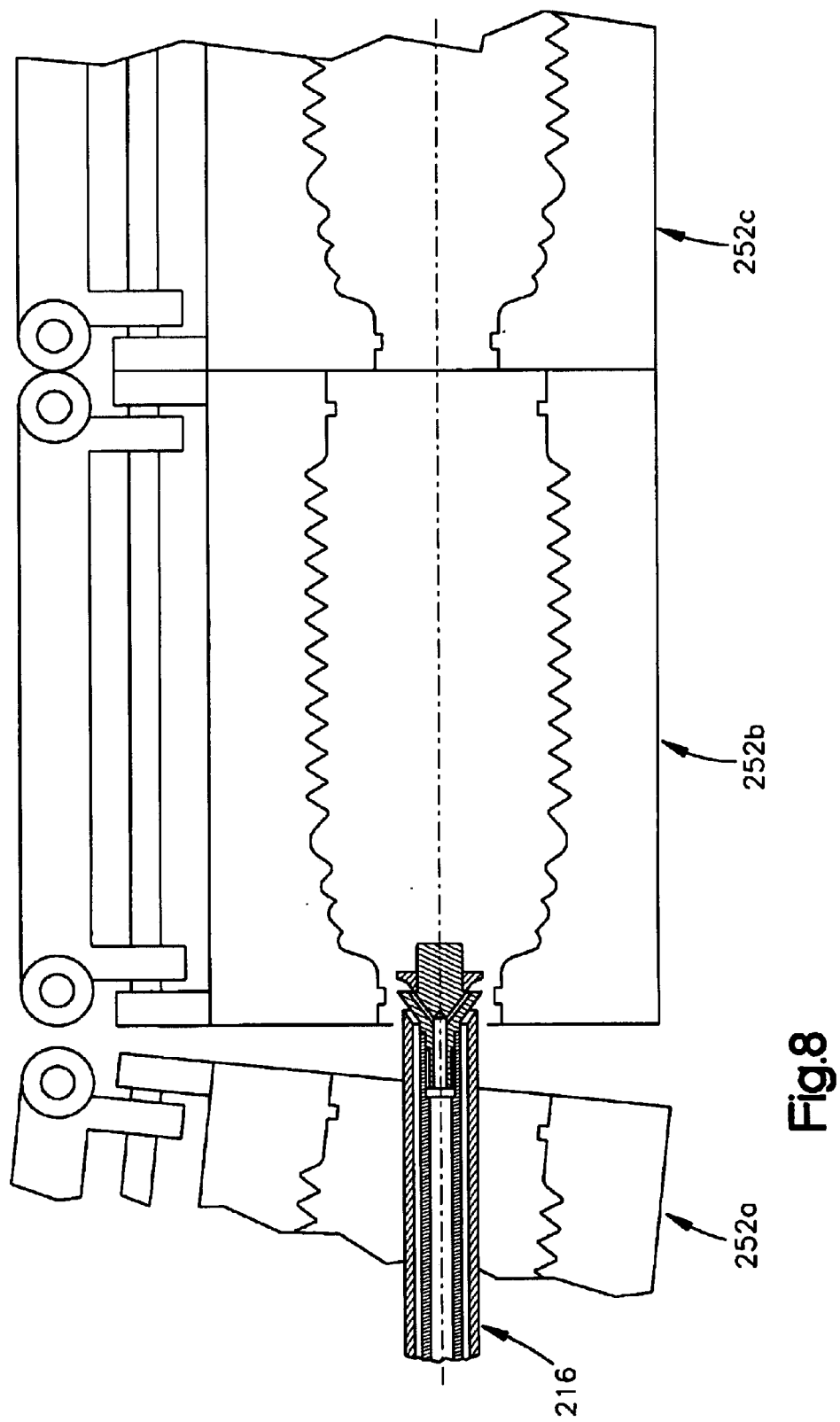
FIG. 8 is a schematic illustration showing interaction of the extruder die of FIG. 7 with a portion of the forming apparatus of FIG. 4.

FIG. 8 shows the interaction of the extruder die 216 with mold blocks 252. Portions of three mold blocks 252 are shown in FIG. 8, from left to right, mold blocks 252a, 252b, and 252c. In the closed position of FIG. 4, the clam-shaped mold halves 254 and 256 are closed to define the mold cavity 272. The leftmost mold block 252a is cammed to an open position so that the clam-shaped mold halves 254 and 256 (invisible in FIG. 8) embrace the extruder 216 which extends axially into the corrugator forward run 222 (FIG. 3), on axis 222a (FIG. 8) of the forward run. The mold block 252b is cammed to a partially closed position, and mold block 252c to a fully closed position. Molten plastic is introduced into the mold cavity 272 when the clam-shaped mold halves 254 and 256 are nearly fully closed.

When the mold blocks 252 are fully closed, a vacuum is drawn in the mold cavity 272 through mold block inner wall 270 (FIGS. 4 and 8) to expand the extruded plastic diametrically against the inner wall 270. The mold block halves 254 and 256 have a plurality of slits 295 (FIG. 5) disposed in the grooves 287 (FIG. 5) of the corrugated inner walls 270 thereof. Each of the slits 295 communicates with one of a plurality of bores 289. The bores 287 extend longitudinally through the mold halves 254 and 256 and communicate with a continuous circular vacuum header 290 (FIG. 6). The vacuum header 290 is, in turn, in communication with a vacuum manifold 292 (FIG. 4) which is maintained under vacuum. This communication is maintained for the entire lower run of the corrugator along which the mold blocks 252 are cammed to a closed position. The vacuum transmitted to the slits 295 of the mold halves 254 and 256 expands the extruded tube of plastic outwardly against the mold block inner wall 182 and around the projections 282 and 286 to form a boot seal having the configuration as shown in FIGS. 1 and 2.

At the point of extrusion, the thermoplastic material is at an elevated temperature, dependent upon the plastic used, in order to make the thermoplastic material pliable and susceptible to molding. It is desirable to cool the thermoplastic material while it is in its expanded state. This is accomplished by means of air plenums 289 (FIG. 5) which extend along the sides of the corrugator 218, for the full length of the forward run 222. The air plenums 289 communicate with a source of pressurized air (not shown). The plenums 289 lead to a pair of arcuate shields 296 which embrace the mold blocks 252 moving in the forward run, in a spaced relationship with the mold blocks 252, to define an annular air chamber 298. Cooling air is introduced continuously into the annular air chamber 298 to cool the mold blocks 252.

From the above description of the invention, those skilled in the art will perceive improvements, changes and modifications. Such improvements, changes and modifications within the skill of the art are intended to be covered by the appended claims.

What is claimed is:

1. A process for making a plastic sleeve having an internal diameter and a circumferential rib projecting inward from the internal diameter at one end of the sleeve and an external first groove aligned with the rib, the rib being for securing said plastic sleeve to a member having a second external groove for receiving the rib, the process comprising the steps of:

(a) feeding plastic into an extruder die;

(b) extruding the plastic from the extruder die as a molten plastic stream into a mold cavity having an inner wall with dimensions greater than the outside dimensions of the molten plastic stream, a first end of the inner wall including a first projection extending radially inward of the mold cavity and circumferentially completely around the mold cavity; and (c) vacuum expanding the molten plastic stream radially against the mold cavity inner wall and around the projection to form a plastic sleeve with the circumferential rib and the aligned external first groove at one end of the plastic sleeve, wherein said inner wall further includes a second end and a corrugated portion between said first end and said second end, and said vacuum expanding step includes the step of expanding said plastic stream radially against the second end and the corrugated portions, and wherein said second end includes a second projection extending radially inward of the mold cavity and circumferentially completely around the mold cavity, and said vacuum expanding step includes the step of expanding said plastic stream radially around the second projection.

2. The process of claim 1 wherein the step of feeding plastic into an extruder die includes the steps of providing a first plastic material into the extruder die from a first hopper and providing a second, different plastic material into the extruder die from a second, different hopper.

3. The process of claim 2 wherein the step of extruding the plastic from the extruder die further includes the steps of forming an outer layer of the plastic sleeve from the first plastic material and forming an inner layer of the plastic sleeve from the second plastic material.

4. The process of claim 1 further including the steps of cooling the plastic after the molded plastic stream has been vacuum expanded, and cutting the cooled plastic in a location near the circumferential rib.

5. An apparatus for making a plastic sleeve having an internal diameter and a circumferential rib projecting inwardly from the internal diameter at one end of the sleeve and an external first groove aligned with the rib, the rib being for securing the plastic sleeve to a member having a second external groove for receiving the rib, the apparatus comprising:

an extruder die for extruding a molten plastic stream;

a mold cavity for receiving plastic from said extruder die, said mold cavity having an inner wall with dimensions greater than the outside dimensions of the molten plastic stream, a first end of said inner wall including a first projection extending radially inward of the mold cavity and circumferentially completely around said mold cavity; and a vacuum system for expanding the molten plastic stream radially against the mold cavity inner wall and around the projection to form a plastic sleeve with the circumferential rib and the aligned external first groove at one end of the sleeve, wherein said inner wall further includes a second end and a corrugated portion between said first end and said second end, and wherein said second end includes a second projection extending radially inward of the mold cavity and circumferentially completely around the mold cavity.

6. The apparatus of claim 5 further including a first hopper for providing a first plastic material into the extruder die and a second hopper for providing a second, different plastic material into the extruder die.

7. The apparatus of claim 6 wherein the extrusion die is configured to form inner and outer layers of the plastic sleeve, the outer layer of the plastic sleeve being formed from the first plastic material and the inner layer of the plastic sleeve being formed from the second plastic material.

8. The apparatus of claim 5 further including a cutter for cutting the plastic sleeve in a location near the circumferential rib.

\* \* \* \* \*